United States Patent
Hu et al.

(10) Patent No.: US 9,904,070 B2
(45) Date of Patent: Feb. 27, 2018

(54) ELECTROMAGNETIC DRIVING MODULE AND CAMERA DEVICE USING THE SAME

(71) Applicant: TDK TAIWAN CORP., Taoyuan (TW)

(72) Inventors: Chao-Chang Hu, Taoyuan (TW); Shu-Shan Chen, Taoyuan (TW); Chih-Wei Weng, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 25 days.

(21) Appl. No.: 15/144,011

(22) Filed: May 2, 2016

(65) Prior Publication Data
US 2017/0123226 A1    May 4, 2017

(30) Foreign Application Priority Data

Nov. 2, 2015   (TW) .............................. 104135992 A

(51) Int. Cl.
*G02B 27/64*   (2006.01)
*G02B 7/02*    (2006.01)
(Continued)

(52) U.S. Cl.
CPC .......... *G02B 27/646* (2013.01); *G02B 7/023* (2013.01); *H02K 33/00* (2013.01); *H02K 41/0356* (2013.01)

(58) Field of Classification Search
None
See application file for complete search history.

(56) References Cited

U.S. PATENT DOCUMENTS 5,825,560 A * 10/1998 Ogura ..................... G02B 7/00
                                                    250/201.2
5,974,270 A * 10/1999 Imura .................. G02B 27/646
                                                       396/55
(Continued)

FOREIGN PATENT DOCUMENTS

JP    2008-065221 A    3/2008
JP    2008-122532 A    5/2008
(Continued)

OTHER PUBLICATIONS

Japanese Office Action dated Sep. 5, 2017 corresponding to Japanese Application No. 2016-202613; pp. 1-7.

*Primary Examiner* — W B Perkey
(74) *Attorney, Agent, or Firm* — Muncy, Geissler, Olds & Lowe, P.C.

(57) ABSTRACT

An electromagnetic driving device is provided, which includes a stationary portion, a movable portion adapted to support an element, a number of rolling balls, a driving magnet, a driving coil, and a magnetic attraction element. The stationary portion and the movable portion are arranged along a main axis. The rolling balls and the driving magnet are positioned between the stationary portion and the movable portion. The driving coil is arranged to correspond to the driving magnet and configured to enable the movement of the movable portion along a direction perpendicular to the main axis. The magnetic attraction element is arranged to correspond to the driving magnet. The magnetic force between the magnetic attraction element and the driving magnet is greater than the sum of the weight of the movable portion, the element, and the magnetic member.

9 Claims, 7 Drawing Sheets

(51) Int. Cl.
*H02K 33/00* (2006.01)
*H02K 41/035* (2006.01)

(56) References Cited

U.S. PATENT DOCUMENTS

| | | | | |
|---|---|---|---|---|
| 9,678,357 | B2* | 6/2017 | Takeuchi | G02B 27/646 |
| 2008/0231955 | A1* | 9/2008 | Otsuka | G02B 27/646 |
| | | | | 359/557 |
| 2009/0097833 | A1* | 4/2009 | Imada | G02B 27/646 |
| | | | | 396/55 |
| 2015/0146025 | A1 | 5/2015 | Bang et al. | |
| 2017/0123226 | A1* | 5/2017 | Hu | G02B 27/646 |

FOREIGN PATENT DOCUMENTS

| JP | 2012-198379 A | 10/2012 |
|---|---|---|
| JP | 2013-083753 A | 5/2013 |
| JP | 2013-231924 A | 11/2013 |

\* cited by examiner

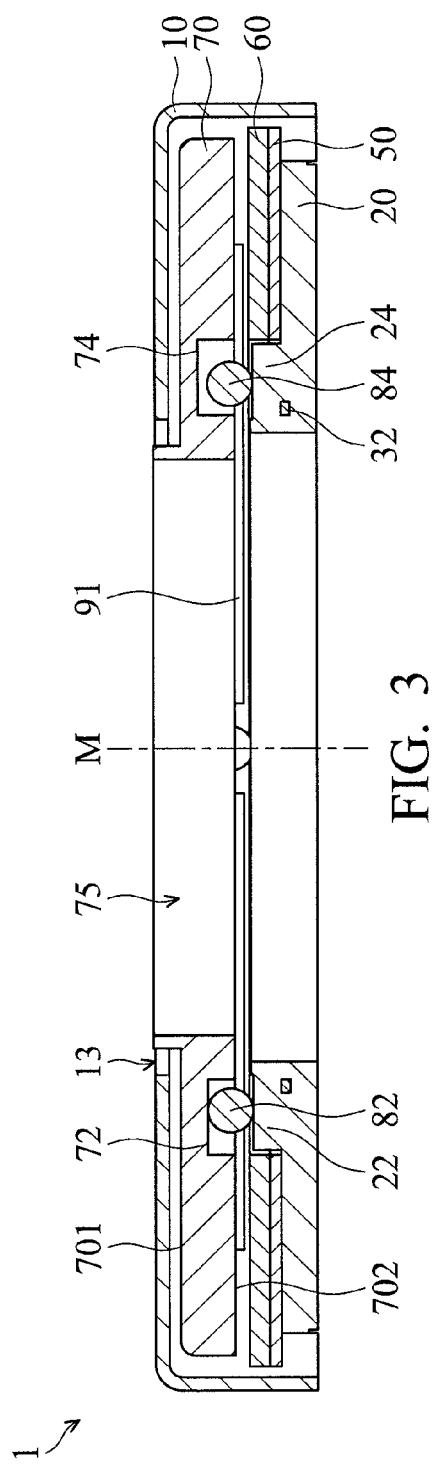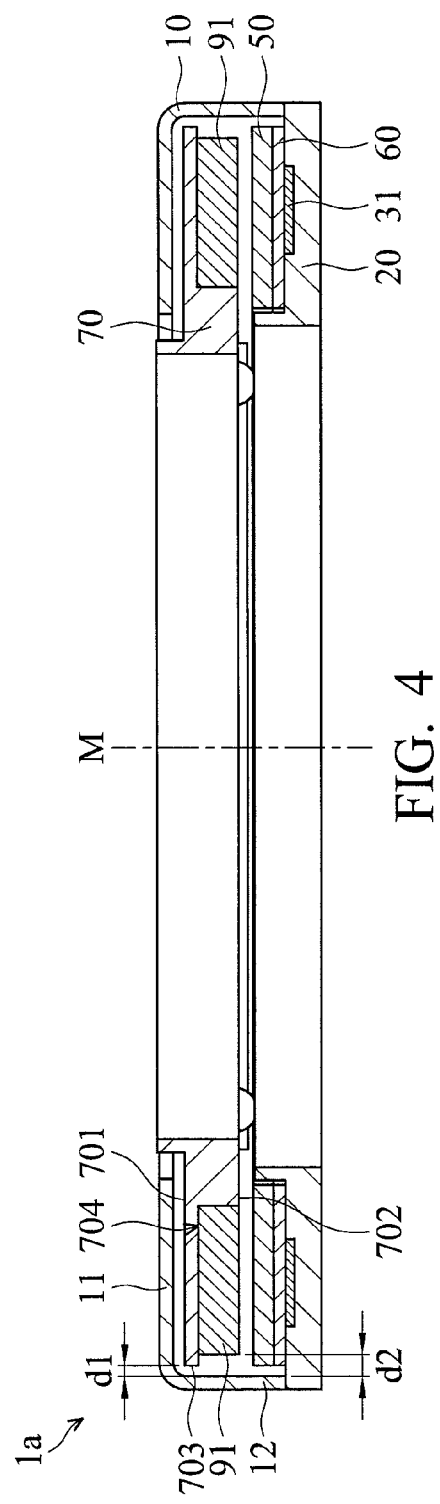

ELECTROMAGNETIC DRIVING MODULE AND CAMERA DEVICE USING THE SAME

CROSS REFERENCE TO RELATED APPLICATIONS

This application claims priority of Taiwan Patent Application No. 104135992, filed on Nov. 2, 2015, the entirety of which is incorporated by reference herein.

BACKGROUND OF THE INVENTION

Field of the Invention

The present invention relates to a driving module and a camera device using the same, and more particularly to an electromagnetic driving module which converts electrical energy into mechanical energy and a camera device using the same.

Description of the Related Art

Generally, an electronic device includes a driving module to drive an element to move a predetermined distance. For example, some of camera devices are equipped with OIS (optical image stabilization) driving modules so as to improve image quality.

However, since a conventional driving module includes a complex driving member, such as a stepper motor, an ultrasonic motor, a piezoelectric actuator, etc. to generate the driving power, and the driving power has to be transmitted by a number of transmission elements, it is not easy to assemble and the manufacturing cost is high. In addition, a conventional driving module is also large in size and has a high power consumption due to its complex construction.

Additionally, the OIS (optical image stabilization) driving module in a conventional camera device uses a number of hanging wires to suspend a lens barrel over a substrate. However, the length of the hanging wires results in an increase in the thickness of the camera device. Additionally, in order to keep the position of the lens barrel relative to the base, the OIS driving module has to operate continuously, which consumes power even when the camera device is not being used to capture images.

Therefore, a driving module that has the advantages of small size and saving electricity is desired by manufacturers.

BRIEF SUMMARY OF THE INVENTION

Accordingly, one objective of the present invention is to provide an electromagnetic driving module, which is configured to provide a driving force to drive an element such as a lens assembly positioned in an electronic device.

In accordance with one embodiment of the disclosure, the electromagnetic driving device includes a stationary portion, a movable portion adapted to support an element (such as a lens assembly), a number of rolling balls, a driving magnet, a driving coil, and a magnetic attraction element. The stationary portion and the movable portion are arranged along a main axis. The rolling balls and the driving magnet are positioned between the stationary portion and the movable portion. The driving coil is arranged to correspond to the driving magnet and configured to enable the movement of the movable portion along a direction perpendicular to the main axis. The magnetic attraction element is arranged to correspond to the driving magnet. The magnetic force between the magnetic attraction element and the driving magnet is greater than the sum of the weight of the movable portion, the element, and the magnetic member.

In the above-mentioned embodiment, the plurality of rolling balls includes a first rolling ball, a second rolling ball, a third rolling ball, and a fourth rolling ball. The first, second, and third rolling balls are in direct contact with the movable portion and the stationary portion, and the fourth rolling ball is separated from the movable portion or the stationary portion by a gap.

In the above-mentioned embodiment, the projection of the magnetic attraction elements in the direction parallel to the main axis is completely within the driving magnet.

In the above-mentioned embodiment, the stationary portion, the driving magnet, and the magnetic attraction element each has a rectangular shape. The long sides of the driving magnet and the magnetic attraction element are parallel to the edge of the stationary portion.

In the above-mentioned embodiment, the electromagnetic driving module further includes a housing surrounding the movable portion and the driving magnet. In the direction perpendicular to the main axis, the distance between the movable portion and the housing is less than the distance between the driving magnet and the housing member.

In the above-mentioned embodiment, the movable portion has a lower surface facing the stationary portion, and a number of depressed portions are formed on the lower surface, wherein each of the depressed portions is used to receive one of the rolling balls.

In the above-mentioned embodiment, in a direction perpendicular to the main axis, the rolling balls are farther away from the main axis than the driving magnet.

In the above-mentioned embodiment, the electromagnetic driving module further includes a substrate positioned between the movable portion and the stationary portion. The driving coil is positioned on the substrate. The substrate has a number of notches, and the rolling balls are placed in the notches.

The other objective of the disclosure is to provide a camera device including the electromagnetic driving module in any one of the above-mentioned embodiments. The camera device further includes a lens assembly disposed on the moveable portion.

In the electromagnetic driving module of the disclosure, the movable portion is slidably connected to the stationary portion. Compared with the conventional driving module, the electromagnetic driving module has an advantage of being easy to assemble and has less thickness.

BRIEF DESCRIPTION OF THE DRAWINGS

The present invention can be more fully understood by reading the subsequent detailed description and examples with references made to the accompanying drawings, wherein:

FIG. 3 shows a cross-sectional schematic view taken along line A-A' of FIG. 2.

FIG. 4 shows a cross-sectional schematic view taken along line B-B' of FIG. 2.

DETAILED DESCRIPTION OF THE INVENTION

Figure 1:
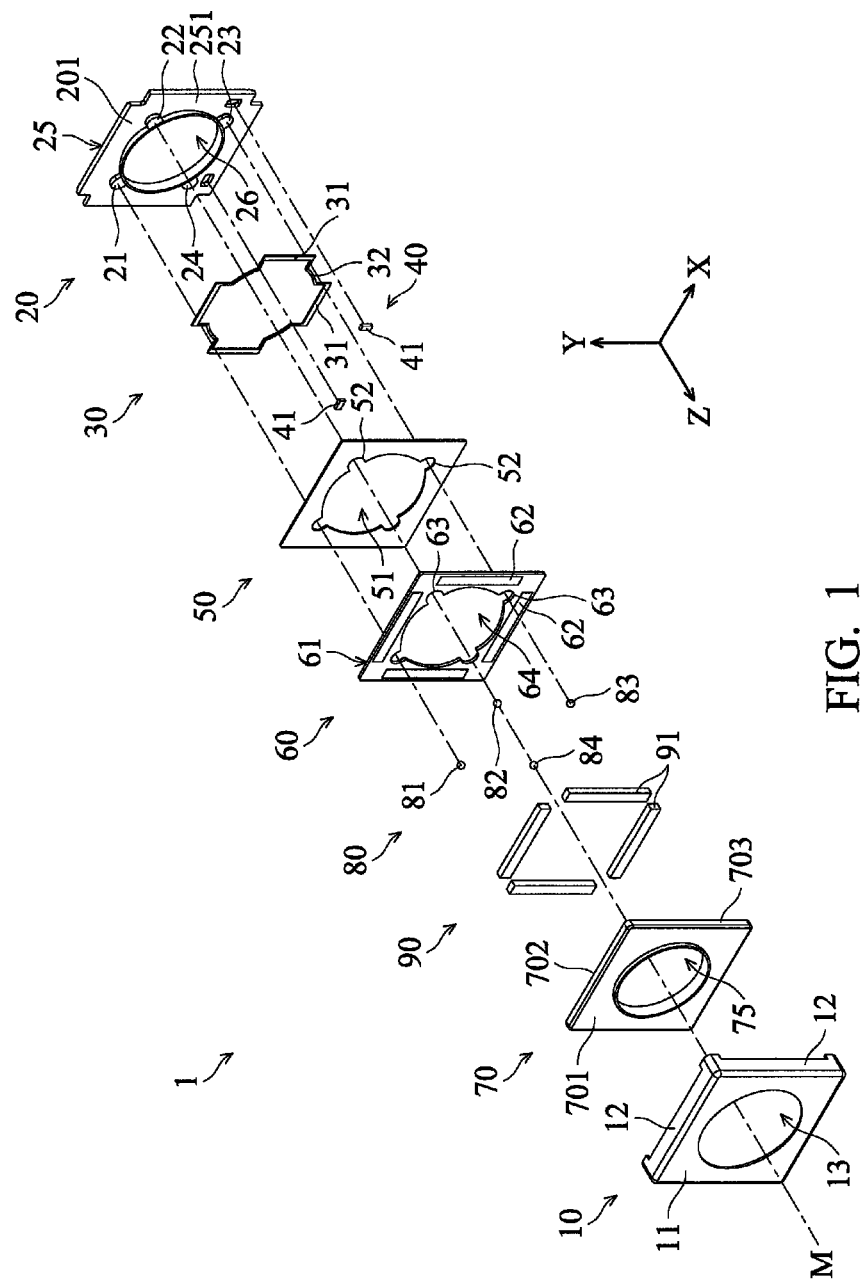
FIG. 1 shows an exploded view of an electromagnetic driving module, in accordance with a first embodiment of the disclosure.

In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate not only that the layer directly contacts the other layer, but also that the layer does not directly contact the other layer, there being one or more intermediate layers disposed between the layer and the other layer.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

FIG. 1 shows an exploded view of an electromagnetic driving module 1 of a first embodiment of the disclosure. The electromagnetic driving module 1 includes a housing 10, a stationary portion 20, a magnetic element unit 30, a sensing assembly 40, a circuit board 50, a coil assembly 60, a movable portion 70, a rolling assembly 80, and a driving magnetic assembly 90. The elements of the electromagnetic driving module 1 can be added to or omitted, and the invention should not be limited by the embodiment.

In the embodiment, the housing 10 includes an upper housing member 11 and one or more lateral housing members 12. The upper housing member 11 has a rectangular shape, and the housing 10 includes four lateral housing members 12 extending from the edges of the upper housing member 11 toward the stationary portion 20. The lateral housing members 12 are connected to each other. An opening 13 is formed at the substantial center of the upper housing member 11, and a main axis M passes through the opening 13.

The stationary portion 20 connects to the housing 10 via the lateral housing members 12 of the housing 10, and the space for receiving the other elements of the electromagnetic driving module 1 is between the stationary portion 20 and the housing 10. In the embodiment, the stationary portion 20 includes a substrate 25, wherein an opening 26 is formed at the substantial center of the substrate 25, and the main axis M passes through opening 26. In addition, the stationary portion 20 includes a number of platforms, such as platforms 21, 22, 23, and 24, extending upwardly from the upper surface 251 of the substrate 25. The platforms 21, 22, 23, and 24 are arranged around the opening 26. In the embodiment, the opening 26 has a circular shape, and the platforms 21, 22, 23, and 24 are arranged to be separated by a fixed distance in a circumferential direction of the opening 26. However, the disclosure should not be limited to the embodiment, in the other non-illustrated embodiment, the platforms are separated apart by different distance. For example, the platforms 21, 22, and 23 are separated from one another by a first distance, and the platform 24 is separated from the platform 21 or the platform 23 by a second distance. The second distance is greater than the first distance. Moreover, the height of the platforms 21, 22, 23, and 24 may be the same or different. For example, the platforms 21, 22, and 23 have a first height, and the platform 24 has a second height. The first height is different from the second height.

The magnetic element unit 30 and the driving magnetic assembly 90 produce a magnetic field to limit the position of the movable portion 70 relative to the stationary portion 20. In the embodiment, the magnetic element unit 30 includes four magnetic attraction elements 31 and four connection portions 32. The four magnetic attraction elements 31 may be magnets or other magnetic attraction material, such as iron, silicon steel, ferro-nickel, ferro-cobalt, stainless steel, soft magnetic ferrite, or a combination thereof. Each of the four magnetic attraction elements 31 has a rectangular shape. Each of the connection portions 32 connects two neighboring magnetic attraction elements 31. The magnetic attraction elements 31 and the connection portions 32 may be made of the same material and formed integrally. Alternatively, the magnetic attraction elements 31 and the connection portions 32 are made of different materials.

The magnetic element unit 30 is connected to the stationary portion 20 by any suitable method. In the embodiment, the magnetic element unit 30 is positioned on the stationary portion 20 by insert molding method. Specifically, the four connection portions 32 of the magnetic element unit 30 are respectively buried in the platforms 21, 22, 23, and 24, and the four magnetic attraction elements 31 are exposed outside of the upper surface 251 of the stationary portion 20. Alternatively, the whole portion of the magnetic element unit 30 is buried in the stationary portion 20.

The sensing assembly 40 is configured to detect the movement of the movable portion 70 and generates a detected signal to a control unit (not shown in figure). The control unit sends control signals to control the movement of the movable portion according to the detected signal from the sensing assembly 40. The sensing assembly 40 is positioned at a designated position of the stationary portion 20. In the embodiment, the sensing element 40 includes two Hall sensors 41, and the fixed portion 20 further includes two receiving recesses formed on the upper surface 201 of the stationary portion 20. The two Hall sensors 41 are respectively positioned in the two receiving recesses.

The circuit board 50 is configured to receive electrical signals from outer device and/or is connected to a power source. In the embodiment, the circuit board 50 is positioned on the upper surface 201 of the stationary portion 20. As shown in FIG. 1, an opening 51 is formed at the substantial center of the circuit board 50, and the main axis M passes through the opening 51. A number of notches 52 are formed at the edge of the opening 51 and arranged to correspond to the platforms 21, 22, 23, and 24.

The coil assembly 60 is configured to receive a driving electric current and produce a magnetic field to drive the movable portion 70 to move relative to the stationary portion 20. In the embodiment, the coil assembly 60 includes a substrate 61 and four driving coils 62. The four driving coils 62 may be formed on the substrate 61 by any suitable method and be electrically connected to the circuit board 50 via the circuit formed in the substrate 61. An opening 64 is formed at the substantial center of the substrate 61, and the main axis M passes through the opening 64. A number of notches 63 are formed at the edge of the opening 64 and arranged to correspond to the platforms 21, 22, 23, and 24. The four driving coils 62 are positioned on the substrate 61 and arranged around the opening 64. However, the disclosure should not be limited to the embodiment. In another non-illustrated embodiment, the substrate 61 of the coil assembly 60 is omitted, and the four driving coils 62 are formed directly on the circuit board 50.

The movable portion 70 is configured to support an element, such as a lens assembly. In the embodiment, the movable portion 70 includes an upper surface 701, a lower surface 702, and a number of lateral surfaces 703. The upper surface 701 directly face the upper housing member 11, and there is no element placed therebetween. The lower surface 702 faces the stationary portion 20. In the embodiment, the upper surface 701 and the lower surface 702 each has a rectangular shape, and the movable portion 70 includes four lateral surfaces 703. Each of the lateral surfaces 703 connects the upper surface 701 to the lower surface 702. A passage 75 penetrates the movable portion 70 along the main axis M and is arranged to correspond to the opening 13.

Figure 2:
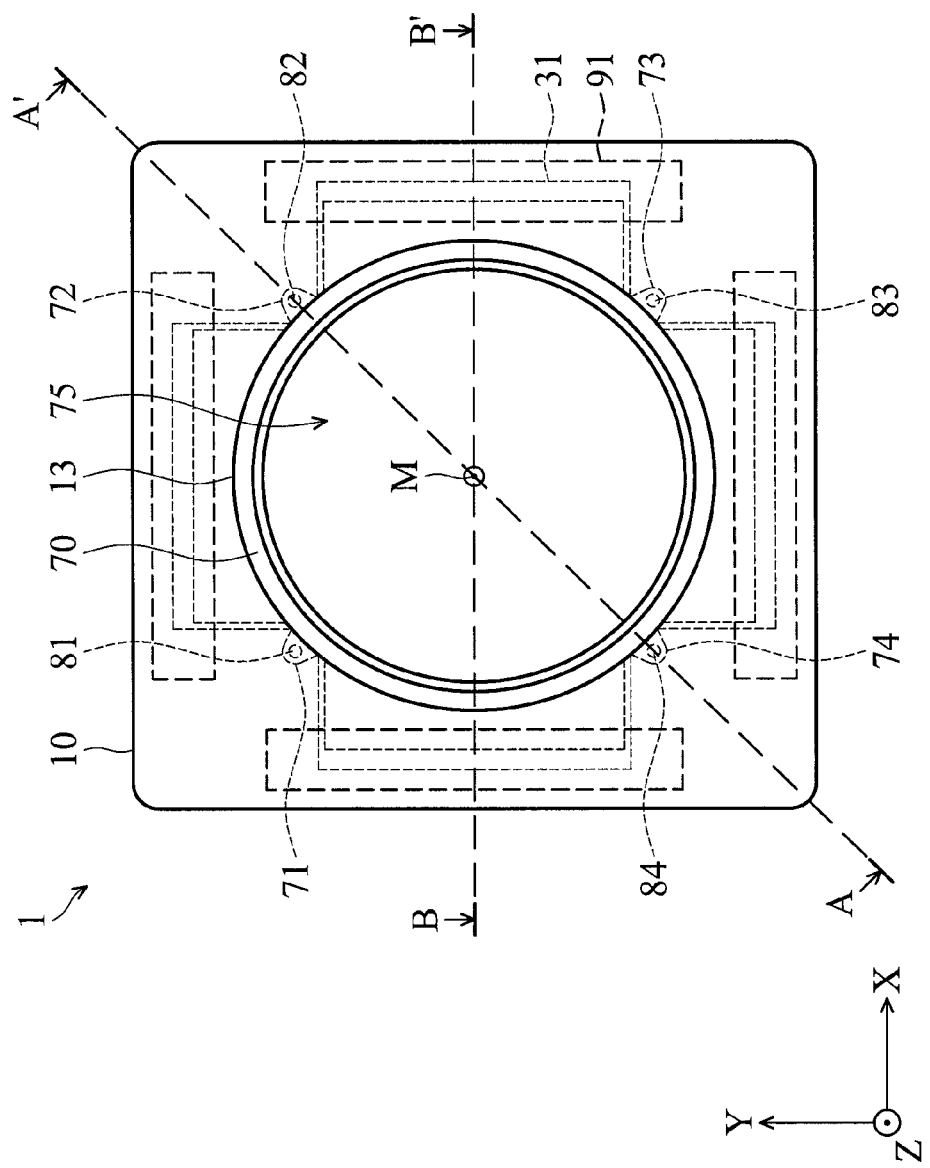
FIG. 2 shows a schematic view of an electromagnetic driving module, in accordance with the first embodiment of the disclosure.

FIG. 2 shows a plane schematic view of the electromagnetic driving module 1, in accordance with the first embodiment of the disclosure. FIG. 3 shows a cross-sectional schematic view taken along line A-A' of FIG. 2. In the embodiment, four recesses 71, 72, 73, and 74 are formed on the lower surface 702 of the movable portion 70 and arranged to correspond to the platforms 21, 22, 23, and 24. In the embodiment, the shape of the recesses 71, 72, 73, and 74 is compatible with the corresponding platforms 21, 22, 23, and 24.

In the embodiment, the distance between four recesses 71, 72, 73, and 74 and the corresponding platforms 21, 22, 23, and 24 are different, they are not separated by a fixed distance. For example, in a direction parallel to the main axis M, the distance between the recess 74 and the corresponding platform 24 is greater than the distance between the recesses 71, 72, and 73 and the corresponding platforms 21, 22, and 23.

The rolling assembly 80 is positioned between the movable portion 70 and the stationary portion 20. The rolling assembly 80 is configured to support the movable portion 70 over the stationary portion 20. Specifically, the rolling assembly 80 includes a number of rolling balls, such as a first rolling ball 81, a second rolling ball 82, a third rolling ball 83, and a fourth rolling ball 84. The first, second, third, and fourth rolling balls 81, 82, 83, and 84 are respectively positioned in the spaces between the four recesses 71, 72, 73, and 74 and the platforms 21, 22, 23, and 24. Additionally, as shown in FIG. 3, the four rolling balls 81, 82, 83, and 84 are placed in the notches 52 of the circuit board 50 and the notches 63 of the coil assembly 60.

In the embodiment, the four rolling balls 81, 82, 83, and 84 have the same diameter. In the direction parallel to the main axis M, each of the recesses 71, 72, and 73 is separated from the corresponding platforms 21, 22, and 23 by a distance that is the same as the diameters of the four rolling balls 81, 82, 83, and 84, but the recess 74 is separated from the corresponding platform 24 by a distance that is greater than the diameters of the four rolling balls 81, 82, 83, and 84. As a result, the first, second, and third rolling balls 81, 82, and 83 are in direct contact with the bottom of the recesses 71, 72, and 73 and the surface of the platforms 21, 22, and 23 at the same time. The fourth rolling ball 74 is not in contact with the bottom of the recess 74 and the surface of the platform 24 at the same time. That is, the fourth rolling ball 84 is separated from the bottom of the recess 74 or the surface of the platform 24 by a gap.

In the embodiment, since the first, second, and third rolling balls 81, 82, and 83 serve as three supporting points to support the movable portion 70, the movable portion 70 is moved horizontally relative to the stationary portion 20 when the electromagnetic driving module 1 is in either a stationary status or an operating status. Additionally, since the gap formed between the fourth rolling ball 74 and the bottom of the recess 74 or the surface of the platform 24 serves as a buffering element, impact damage to the element(s) placed on the movable portion 70 of the electromagnetic driving module 1 is avoided. However, it should be appreciated that many variations and modifications can be made to embodiments of the disclosure.

For example, in another non-illustrated embodiment, the diameter of the fourth rolling ball 84 is smaller than the diameter of the first, second, and third rolling balls 81, 82, and 83. In addition, each of the recesses 71, 72, 73, and 74 are separated from the corresponding platforms 21, 22, 23, and 24 by a distance that is the same as the diameter of the first, second, and third rolling ball 81, 82, and 83. In above-mentioned arrangement, when the four rolling balls 81, 82, 83, and 84 are placed in the spaces between the four recesses 71, 72, 73, and 74 and the platforms 21, 22, 23, and 24, the first, the second, and the third rolling balls 81, 82, and 83 are in direct contact with the bottom of the corresponding recesses 71, 72, and 73 and the surfaces of the corresponding platforms 21, 22, and 23. However, the fourth rolling ball 74 is not in contact with the bottom of the recess 74 and the surface of the platform 24 at the same time. That is, the fourth rolling ball 74 is separated from the bottom of the recess 74 or the surface of the platform 24 by a gap.

FIG. 4 shows a cross-sectional schematic view taken along line B-B' of FIG. 2. In the embodiment, as shown in FIG. 4, four depressed portions 704 (only two depressed portions 704 are shown in FIG. 4) are formed on the lower surface 702 of the movable portion 70, and each of the four depressed portions 704 connects one of the lateral surface 703 of the movable portion 70.

The driving magnetic assembly 90 includes four driving magnets 91. The four driving magnets 91 are respectively positioned in the four depressed portions 704. In the embodiment, as shown in FIG. 4, the four driving magnets 91 (only two driving magnets 91 are shown in FIG. 4) are arranged to correspond to the four magnetic attraction elements 31 (only two magnetic attraction elements 31 are shown in FIG. 4). The magnetic force produced between the four magnetic attraction elements 31 and the four driving magnets 91 is greater than the weight of the movable portion 70 and all elements that are positioned on the movable portion 70. For example, if the movable portion 70 is configured to support a lens assembly (not shown in FIG. 4), the magnetic force produced between the four magnetic attraction elements 31 and the four driving magnets 91 is greater than the weight of the movable portion 70 and the lens assembly.

In the embodiment, each of the four driving magnets 91 has a rectangular shape, and each of the four magnetic attraction elements 31 has a rectangular shape. The long sides of the driving magnets 91 and the magnetic attraction elements 31 are parallel to the adjacent lateral housing members 12.

Additionally, the width of the short sides of the driving magnets 91 is greater than the width of the short sides of the magnetic attraction elements 31. The ratio of the width of the short sides of the driving magnets 91 and the width of the short sides of the magnetic attraction elements 31 may be adjusted according to the desired properties of the electromagnetic driving module 1. In one exemplary embodiment, the ratio thereof may be in a range of about 0.01 to about 100. In the stationary status, each of the magnetic attraction elements 31 is in a position that is aligned with the substantial center of the corresponding driving magnet 91, and the projection of each of the magnetic attraction elements 31, in the direction parallel to the main axis M, is completely within the corresponding driving magnet 91.

Moreover, as shown in FIG. 4, in the embodiment, because the width of the depressed portion 704 is greater than the width of the driving magnets 91 in the direction perpendicular to the main axis M. As a result, the distance between the movable portion 70 and the housing 10 is different from the distance between each of the driving magnets 91 and the housing member 10. For example, the distance between the lateral surface 703 of the movable portion 70 and the lateral housing members 12 is d1, and the distance between each of the driving magnets 91 and the lateral housing members 12 is d2, the distance d1 is smaller than the distance d2. The advantage of these features regarding to the driving magnetic assembly 90 will be described in the paragraphs below.

Referring to FIGS. 1-4, in accordance with one embodiment of the disclosure, the operating method of the electromagnetic driving module 1 is described below.

In the embodiment, when the electromagnetic driving module 1 is in a stationary status, the movable portion 70 is placed on the stationary portion 20 by the magnetic force produced by the driving magnets 91 and the magnetic attraction elements 31. At this time, since the magnetic force is greater than the weight of the movable portion 70 and all elements placed on the movable portion 70, the movement of the movable portion 70 in the Z-axis direction (parallel to the main axis M) is limited. Additionally, since the movable portion 70 is placed on the stationary portion 20 via the first, second, and third rolling balls 81, 82, and 83, the movable portion 70 is kept parallel to the stationary portion 20. Compared with the conventional technique in which the movable portion is suspended above the stationary portion by hanging wires, the electromagnetic driving module 1 of the disclosure needs no additional power to limit the position of the movable portion 70 relative to the stationary portion 20, and it accordingly has less power consumption.

To drive the electromagnetic driving module 1, a control unit of an electronic device may issue a driving electronic current to the driving coils 62 of the electromagnetic driving module 1, so that the movable portion 70 is driven to move in the direction perpendicular to the main axis M to a position that is aligned with the main axis M by the magnetic force produced between the driving coils 62 and the driving magnets 91. During the operation of electromagnetic driving module 1, the Hall sensors 41 of the sensing assembly 40 continuously detect the magnetic field change of the driving magnets 91 and send signals regarding the position of the movable portion 70 to the control unit to realize closed-loop control.

In the embodiment, thanks to the feature of the long sides of the driving magnets 91 and the magnetic attraction elements 31 being parallel to the adjacent lateral housing members 12, the magnetic attraction force is distributed symmetrically. Therefore, a rotational displacement (so called cross talk due to a rotation of the movable portion 70 relative to the Z-axis) will not occur during the movement of the movable portion 70. The control accuracy of the movable portion 70 is improved accordingly.

Additionally, due to the projection of each of the magnetic attraction elements 31 in the direction parallel to the main axis M being completely within the corresponding driving magnet 91, the magnetic attraction force will not decay even if excessive movement of the movable portion 70 occurs.

Moreover, because the distance between the movable portion 70 and the housing 10 is smaller than the distance between each of the driving magnets 91 and the housing 10, the lateral surfaces 703 protect the driving magnets 91 from being struck by the lateral housing members 12 when the movable portion 70 hits the lateral housing members 12 during the movement of the movable portion 70. Therefore, the reliability of the electromagnetic driving module 1 is improved.

Figure 5:
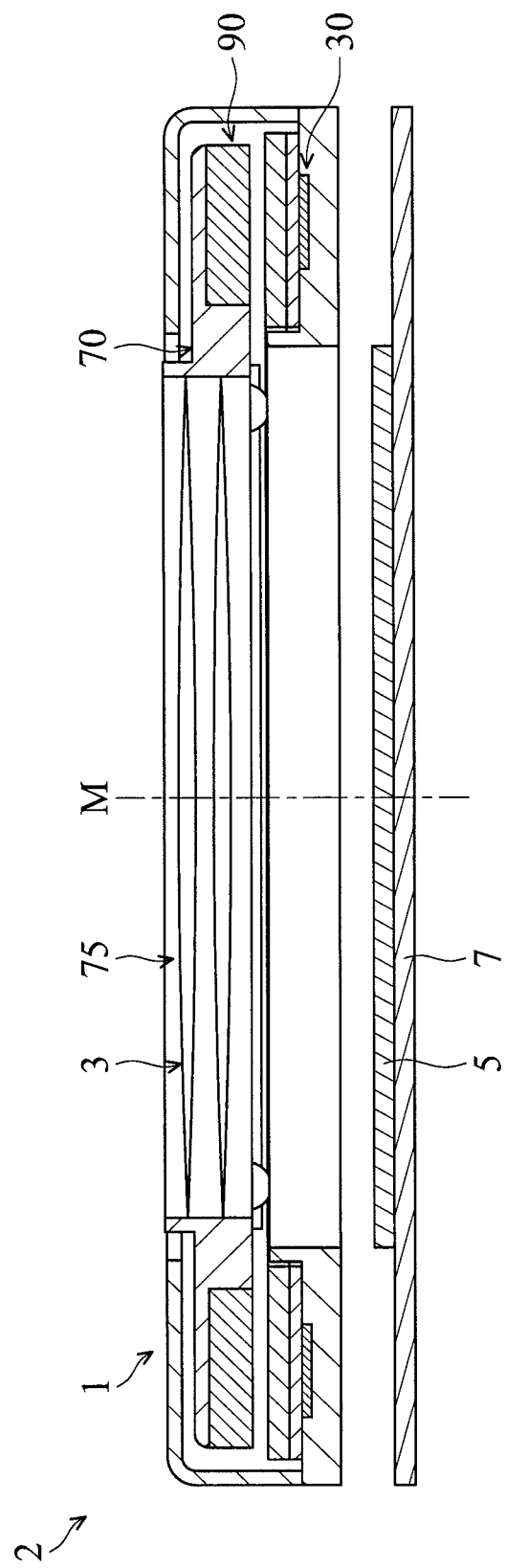
FIG. 5 shows a schematic view of a camera device, in accordance with one embodiment of the disclosure.

FIG. 5 shows a schematic view of a camera device 2, in accordance with one embodiment of the disclosure. In the embodiment, the camera device 2 includes the electromagnetic driving module 1, a lens assembly 3, a main circuit board 4, and an optical sensor 5. The lens assembly 3 is positioned in the passage 75 of the movable portion 70 and includes one or more lenses arranged along the main axis M, wherein the optical axis of the lenses are overlapped with the main axis M. In the embodiment, the magnetic attraction force between the magnetic element unit 30 and the driving magnetic assembly 90 are designed according to the weight of the lens assembly 3. For example, the magnetic attraction force between the magnetic element unit 30 and the driving magnetic assembly 90 is greater than the weight of the lens assembly 3, the movable portion 70 and the driving magnetic assembly 90. The optical sensor 5 is positioned on the main circuit board 4 and is aligned with the main axis M. The optical sensor 5 is a CMOS sensor, for example. The optical sensor 5 receives light passing through the lens assembly 3 and produces an image signal.

In the embodiment, when the camera device 2 is used to capture images, the position of the lens assembly 3 is continuously adjusted by the electromagnetic driving module 1, so that the light that passes through the lens assembly 3 can be correctly guided to the optical sensor 5 even if the camera device 2 shakes. As a result, the image quality of the camera device 2 is improved.

Figure 6:
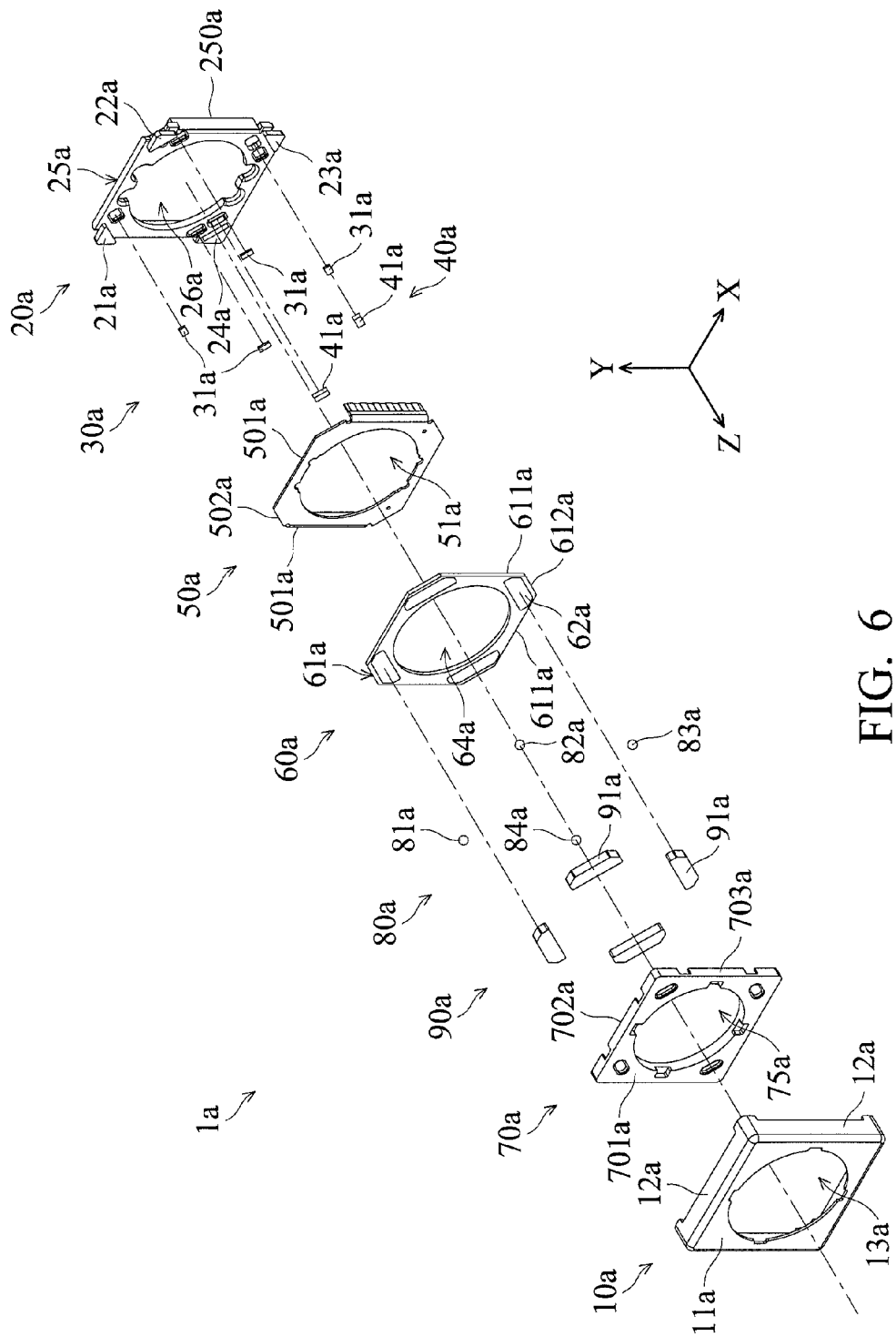
FIG. 6 shows an exploded view of an electromagnetic driving module, in accordance with a second embodiment of the disclosure.

FIG. 6 shows an exploded view of an electromagnetic driving module 1a of a first embodiment of the disclosure. The electromagnetic driving module 1a includes a housing 10a, a stationary portion 20a, a magnetic element unit 30a, a sensing assembly 40a, a circuit board 50a, a coil assembly 60a, a movable portion 70a, a rolling assembly 80a, and a driving magnetic assembly 90a. The elements of the electromagnetic driving module 1a can be added to or omitted, and the invention should not be limited by the embodiment.

In the embodiment, the housing 10a includes an upper housing member 11a and one or more lateral housing members 12a. The upper housing member 11a has a rectangular shape, and the housing 10a includes four lateral housing members 12a extending from the edges of the upper housing member 11a toward the stationary portion 20a. The lateral housing members 12a are connected to each other. An opening 13a is formed at the substantial center of the upper housing member 11a, and a main axis M passes through the opening 13a.

The stationary portion 20a connects to the housing 10aa via the lateral housing members 12a of the housing 10a, and the space for receiving the other elements of the electromagnetic driving module 1 is defined as being between the stationary portion 20a and the housing 10a. In the embodiment, the stationary portion 20a includes a substrate 25, wherein an opening 26a is formed at the substantial center of the substrate 25, and the main axis M passes through opening 26a. In addition, the stationary portion 20a includes a number of platforms, such as platforms 21a, 22a, 23a, and 24a, extending upwardly from the upper surface of the substrate 25. The platforms 21a, 22a, 23a, and 24a are arranged at the corner of two edges 250a of the substrate 25a. The height of the platforms 21a, 22a, and 23a, and 24a may be the same or different. For example, the height of the platforms 21a, 22a, and 23a is different from the height of the platform 24a.

The magnetic element unit 30a and the driving magnetic assembly 90a produce a magnetic field to limit the position of the movable portion 70a relative to the stationary portion 20a. In the embodiment, the magnetic element unit 30a includes four magnetic attraction elements 31a. The four magnetic attraction elements 31a may be magnets or other magnetic attraction material, such as iron, silicon steel, ferro-nickel, ferro-cobalt, stainless steel, soft magnetic ferrite, or a combination thereof. The magnetic element unit 30a is connected to the stationary portion 20a by any suitable method. In the embodiment, four accommodation recesses are formed on the upper surface of the stationary portion 20a and respectively arranged to be adjacent to the four platforms 21a, 22a, 23a, and 24a. The four magnetic attraction elements 31a are placed in the four accommodation recesses.

The sensing assembly 40a is configured to detect the movement of the movable portion 70a and generate a detected signal to a control unit (not shown in figure). The control unit sends control signals to control the movement of the movable portion according to the detected signal from the sensing assembly 40a. The sensing assembly 40a is positioned at a designated position of the stationary portion 20a. In the embodiment, the sensing element 40a includes two Hall sensors 41a, and the fixed portion 20a further includes two receiving recesses formed on the upper surface of the stationary portion 20a. The two Hall sensors 41a are positioned in the two respective receiving recesses.

The circuit board 50a is configured to receive electrical signals from an outer device and/or is connected to a power source. In the embodiment, the circuit board 50a is positioned on the stationary portion 20a. As shown in FIG. 6, the circuit board 50a includes four sides 501a, and every two sides 501a are connected to one another by a connection side 502a. The positioning and profile of the connection sides 502a is compatible with the positioning and profile of the inner edge of the corresponding platforms 21a, 22a, 23a, and 24a.

The coil assembly 60a is configured to receive a driving electric current and produce a magnetic field to drive the movable portion 70a to move relative to the stationary portion 20a. In the embodiment, the coil assembly 60a includes a substrate 61a and four driving coils 62a. The four driving coils 62a may be formed on the substrate 61a by any suitable method and are electrically connected to the circuit board 50a via the circuit formed in the substrate 61a. An opening 64a is formed at the substantial center of the substrate 61a, and the main axis M passes through the opening 64a. As shown in FIG. 6, the substrate 61a includes four sides 611a, and every two sides 611a are connected to one another by a connection side 612a. The positioning and profile of the connection sides 612a is compatible with the positioning and profile of the inner edge of the corresponding platforms 21a, 22a, 23a, and 24a. The four driving coils 62a are positioned on the substrate 61a and respectively arranged to be adjacent to the four connection side 612a. However, the disclosure should not be limited to the embodiment. In another non-illustrated embodiment, the substrate 61a of the coil assembly 60a is omitted, and the four driving coils 62a are formed directly on the circuit board 50a.

The movable portion 70a is configured to support an element, such as a lens assembly. In the embodiment, the movable portion 70a includes an upper surface 701a, a lower surface 702a, and a number of lateral surfaces 703a. The upper surface 701a directly face the upper housing member 11a, and the lower surface 702a faces the stationary portion 20a. In the embodiment, the upper surface 701a and the lower surface 702a each has a rectangular shape, and the movable portion 70a includes four lateral surfaces 703a. Each of the lateral surfaces 703a connects the upper surface 701a to the lower surface 702a. A passage 75a penetrates the movable portion 70a along the main axis M and is arranged to correspond to the opening 13a.

Figure 7:
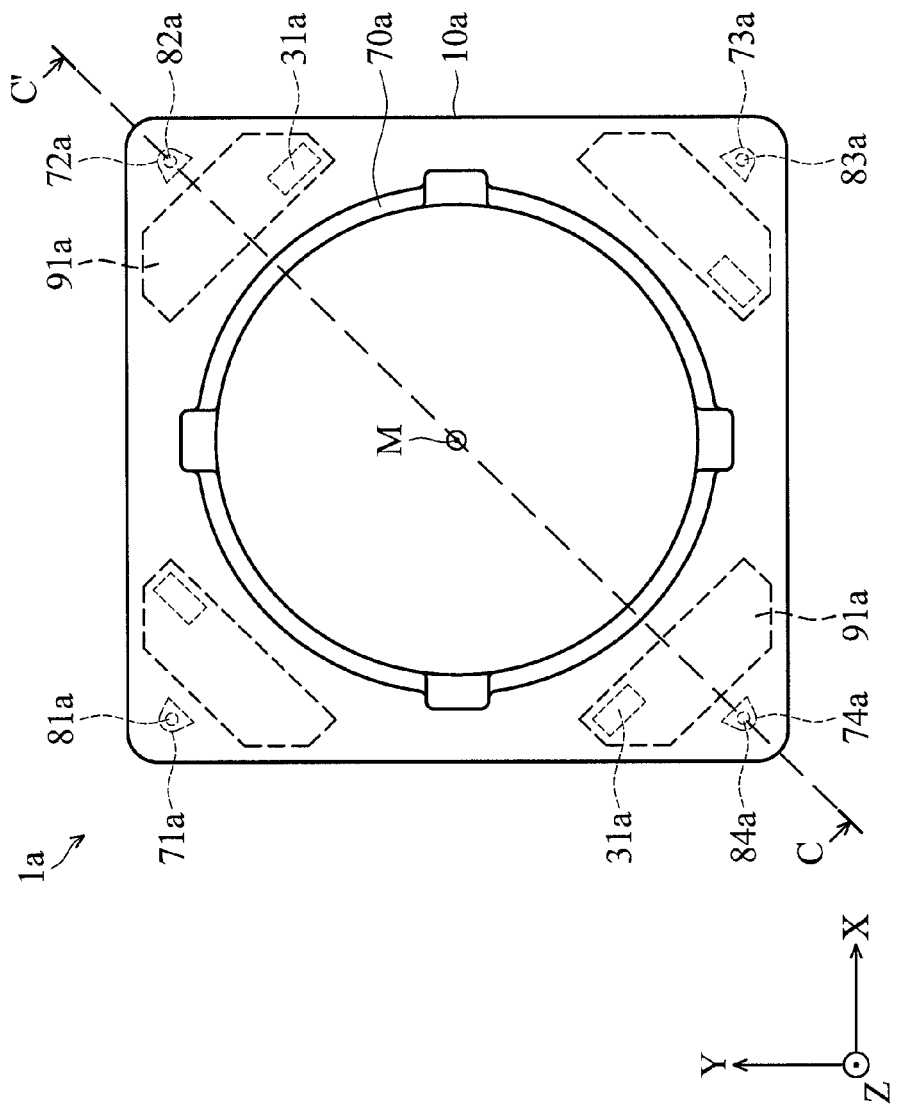
FIG. 7 shows a schematic view of an electromagnetic driving module, in accordance with the second embodiment of the disclosure.
Figure 8:
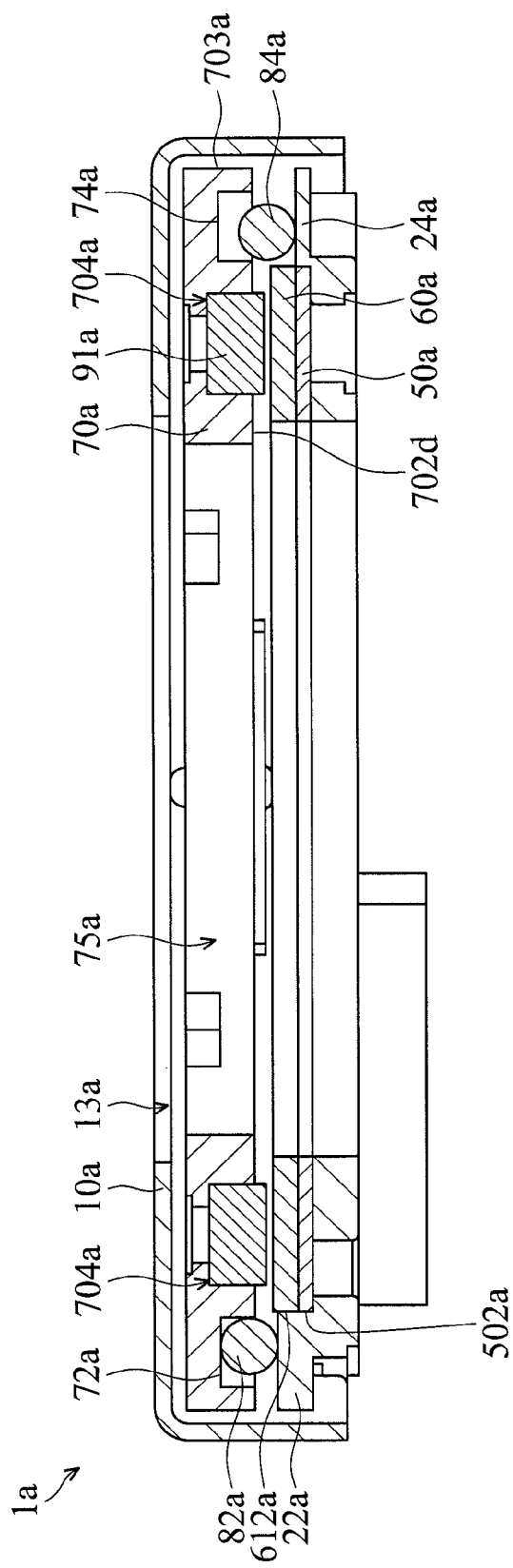
FIG. 8 shows a cross-sectional schematic view taken along line C-C' of FIG. 7.

FIG. 7 shows a plane schematic view of the electromagnetic driving module 1a, in accordance with the first embodiment of the disclosure. FIG. 8 shows a cross-sectional schematic view taken along line C-C' of FIG. 7. In the embodiment, four recesses 71a, 72a, 73a, and 74a are formed on the lower surface 702a of the movable portion 70a and arranged to correspond to the platforms 21a, 22a, 23a, and 24a. In the embodiment, the shape of the recesses 71a, 72a, 73a, and 74a is compatible with the corresponding platforms 21a, 22a, 23a, and 24a.

In the embodiment, the distance between four recesses 71a, 72a, 73a, and 74a and the corresponding platforms 21a, 22a, 23a, and 24a are different, they are not separated by a fixed distance. For example, in a direction parallel to the main axis M, the distance between the recess 74a and the corresponding platform 24a is greater than the distance between the recesses 71a, 72a, and 73a and the corresponding platforms 21a, 22a, and 23a.

The rolling assembly 80a is positioned between the movable portion 70a and the stationary portion 20a. The rolling assembly 80a is configured to support the movable portion 70a over the stationary portion 20a. Specifically, the rolling assembly 80a includes a number of rolling balls, such as a first rolling ball 81a, a second rolling ball 82a, a third rolling ball 83a, and a fourth rolling ball 84a. The first, second, third, and fourth rolling balls 81a, 82a, 83a, and 84a are respectively positioned in the spaces between the four recesses 71a, 72a, 73a, and 74a and the platforms 21a, 22a, 23a, and 24a.

Similar to the embodiment shown in FIGS. 1-4, in the embodiment, one of the four rolling balls is not in contact with the bottom of the recess and the platform at the same time and a gap is formed between the rolling ball and the bottom of the recess or the platform. For example, the fourth rolling ball 84a is not in contact with the bottom of the recess 74a and the platform 24a at the same time and separated from the bottom of the recess 74a or the platform 24a by a gap.

Referring to FIG. 8, in the embodiment, four depressed portions 704a (only two depressed portions 704a are shown in FIG. 8) are formed on the lower surface 702a of the movable portion 70a. The extension direction of the depressed portion 704a is not parallel to the extension direction of the adjacent lateral surface 703a, and an included angle is formed between the two directions. In addition, in a direction perpendicular to the main axis M, the platforms 21a, 22a, 23a, and 24a are farther away from the main axis M than the depressed portions 704a.

The driving magnetic assembly 90a includes four driving magnets 91a. The four driving magnets 91a are respectively positioned in the four depressed portions 704a. In the embodiment, as shown in FIG. 7, the four driving magnets 91a (only two driving magnets 91a are shown in FIG. 7) are arranged to correspond to the four magnetic attraction elements 31a (only two magnetic attraction elements 31a are shown in FIG. 4). The magnetic force produced between the four magnetic attraction elements 31a and the four driving magnets 91a is greater than the weight of the movable portion 70a and all elements that are positioned on the movable portion 70a.

In the embodiment, the first, second, third, and fourth rolling balls 81a, 82a, 83a, and 84a are positioned at four respective corners of the stationary portion 20a. In a direction perpendicular to the main axis M, the first, second, third, and fourth rolling balls 81a, 82a, 83a, and 84a are farther away from the main axis M than the driving magnets 91a. As a result, the size of the electromagnetic driving module 1a is reduced.

In the embodiments of the electromagnetic driving module of the disclosure, the movable portion is slidably placed on the stationary portion by creating a contact therebetween. Since the hanging wires for suspending the movable portion in the conventional techniques are omitted, the electromagnetic driving module has a reduced thickness. Additionally, with the magnetic force produced between the driving magnets and the magnetic attraction element, the control accuracy of the movable portion is improved. As a result, when the electromagnetic driving module is used in a camera device, the camera device has a higher image quality.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An electromagnetic driving module, comprising
a movable portion adapted to support an element;
a stationary portion, wherein the stationary portion and the movable portion are arranged along a main axis;
a plurality of rolling balls positioned between the stationary portion and the movable portion, wherein the plurality of rolling balls comprises a first rolling ball, a second rolling ball, a third rolling ball, and a fourth rolling ball and wherein the first, second, and third rolling balls are in direct contact with the movable portion and the stationary portion, and the fourth rolling ball is separated from the movable portion or the stationary portion by a gap;
a driving magnet positioned between the stationary portion and the movable portion;
a driving coil arranged to correspond to the driving magnet and configured to enable the movement of the movable portion along a direction perpendicular to the main axis; and
a magnetic attraction element arranged to correspond to the driving magnet;
wherein magnetic force between the magnetic attraction element, and the driving magnet is greater than the sum of the weight of the movable portion, the element, and the magnetic member.

2. The electromagnetic driving module as claimed in claim 1, wherein the projection of the magnetic attraction elements in the direction parallel to the main axis is completely within the driving magnet.

3. The electromagnetic driving module as claimed in claim 1, wherein the stationary portion, the driving magnet, and the magnetic attraction element each has a rectangular shape;
wherein the long sides of the driving magnet and the magnetic attraction element are parallel to the edge of the stationary portion.

4. The electromagnetic driving module as claimed in claim 1, further comprising a housing surrounding the movable portion and the driving magnet;
wherein in the direction perpendicular to the main axis, the distance between the movable portion and the housing is less than the distance between the driving magnet and the housing member.

5. The electromagnetic driving module as claimed in claim 1, further comprising a housing, and an opening that is arranged to correspond to the main axis is formed on the housing;
wherein a passage adapted for receiving the element penetrates the movable portion along the main axis and faces the opening.

6. The electromagnetic driving module as claimed in claim 1, wherein the movable portion has a lower surface facing the stationary portion, and a plurality of depressed portions are formed on the lower surface;
wherein each of the depressed portions is used to receive one of the rolling balls.

7. The electromagnetic driving module as claimed in claim 1, wherein in a direction perpendicular to the main axis, the rolling balls are farther away from the main axis than the driving magnet.

8. The electromagnetic driving module as claimed in claim 1, wherein the driving magnet is disposed on the movable portion, and the driving coil and the magnetic attraction element are disposed on the stationary portion.

9. A camera device, comprising:
a lens assembly;
a movable portion configured to support the lens assembly;

a stationary portion, wherein the stationary portion and the movable portion are arranged along a main axis;

a plurality of rolling balls positioned between the stationary portion and the movable portion, wherein the plurality of rolling balls comprises a first rolling ball, a second rolling ball, a third rolling ball, and a fourth rolling ball and wherein the first, second, and third rolling balls are in direct contact with the movable portion and the stationary portion, and the fourth rolling ball is separated from the movable portion or the stationary portion by a gap;

a driving magnet positioned between the stationary portion and the movable portion;

a driving coil arranged to correspond to the driving magnet and configured to enable the movement of the movable portion along a direction perpendicular to the main axis; and a magnetic attraction element arranged to correspond to the driving magnet;

wherein magnetic force between the magnetic attraction element and the driving magnet is greater than the sum of the weight of the movable portion, the element, and the magnetic member.

* * * * *